(12) United States Patent
Liu et al.

(10) Patent No.: US 10,102,350 B1
(45) Date of Patent: Oct. 16, 2018

(54) SYSTEM AND METHOD FOR PROTECTING DATA STORED IN THE CONTROL REGISTERS OF AN INTEGRATED CIRCUIT

(75) Inventors: Zheng Liu, Sunnyvale, CA (US); Jiande Jiang, San Jose, CA (US)

(73) Assignee: Entropic Communications, LLC, Carlsbad, CA (US)

(*) Notice: Subject to any disclaimer, the term of this patent is extended or adjusted under 35 U.S.C. 154(b) by 1116 days.

(21) Appl. No.: 11/197,561

(22) Filed: Aug. 3, 2005

(51) Int. Cl.
*G06F 1/26* (2006.01)
*G06F 21/10* (2013.01)

(52) U.S. Cl.
CPC .................................. *G06F 21/10* (2013.01)

(58) Field of Classification Search
USPC ............................................ 713/194; 726/34
See application file for complete search history.

(56) References Cited

U.S. PATENT DOCUMENTS

| | | | | |
|---|---|---|---|---|
| 5,974,513 A * | 10/1999 | Matsuo et al. | ................. | 711/164 |
| 6,016,170 A * | 1/2000 | Takayama | .............. | H03D 7/161 |
| | | | | 348/731 |
| 6,266,271 B1 * | 7/2001 | Kawamura | ............... | 365/185.04 |
| 6,715,049 B1 * | 3/2004 | Hayakashi | .......... | G06F 12/1441 |
| | | | | 710/107 |
| 7,069,404 B1 * | 6/2006 | Roche | ................. | G06F 12/1433 |
| | | | | 711/163 |
| 2003/0023901 A1 * | 1/2003 | Hack et al. | ..................... | 714/25 |
| 2003/0140238 A1 * | 7/2003 | Turkboylari | .................. | 713/193 |
| 2004/0095830 A1 * | 5/2004 | Tanaka | .......................... | 365/222 |
| 2006/0128354 A1 * | 6/2006 | Carle et al. | ................ | 455/404.1 |

* cited by examiner

*Primary Examiner* — Christopher J Brown
(74) *Attorney, Agent, or Firm* — McAndrews, Held & Malloy, Ltd.

(57) ABSTRACT

The present invention provides a system and method for protecting data stored in the control registers of an integrated circuit, such as a television chip. The system and method use one or more selectively activated read protection modules to prevent the control registers from being read unless a predetermined key or password is entered. The password or key may be stored in password registers within the chip. A key access generator will enable read access of the control registers if correct values are written to the appropriate password registers. The key access generator may enable read access for a predetermined period of time or until it receives another input.

10 Claims, 1 Drawing Sheet

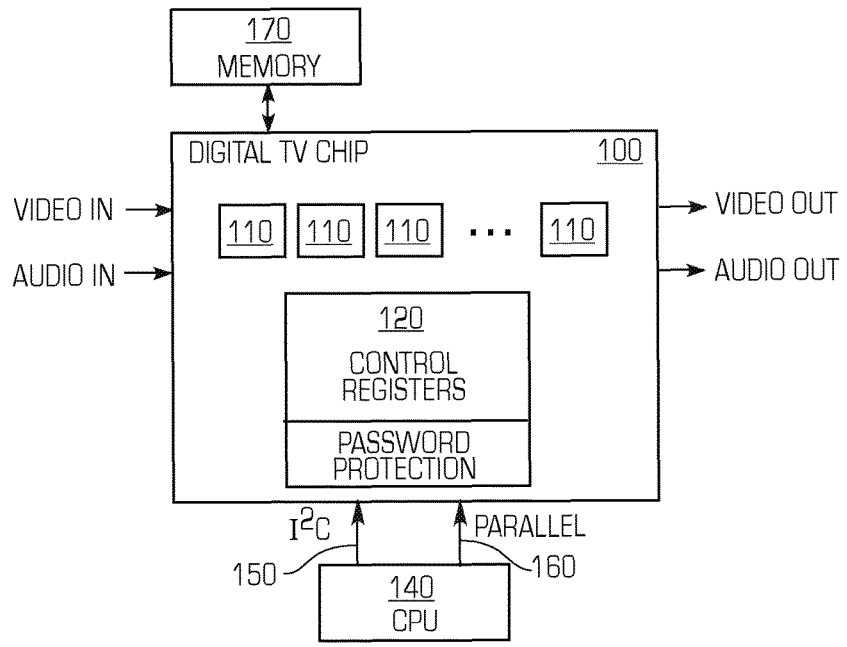
FIG. 1
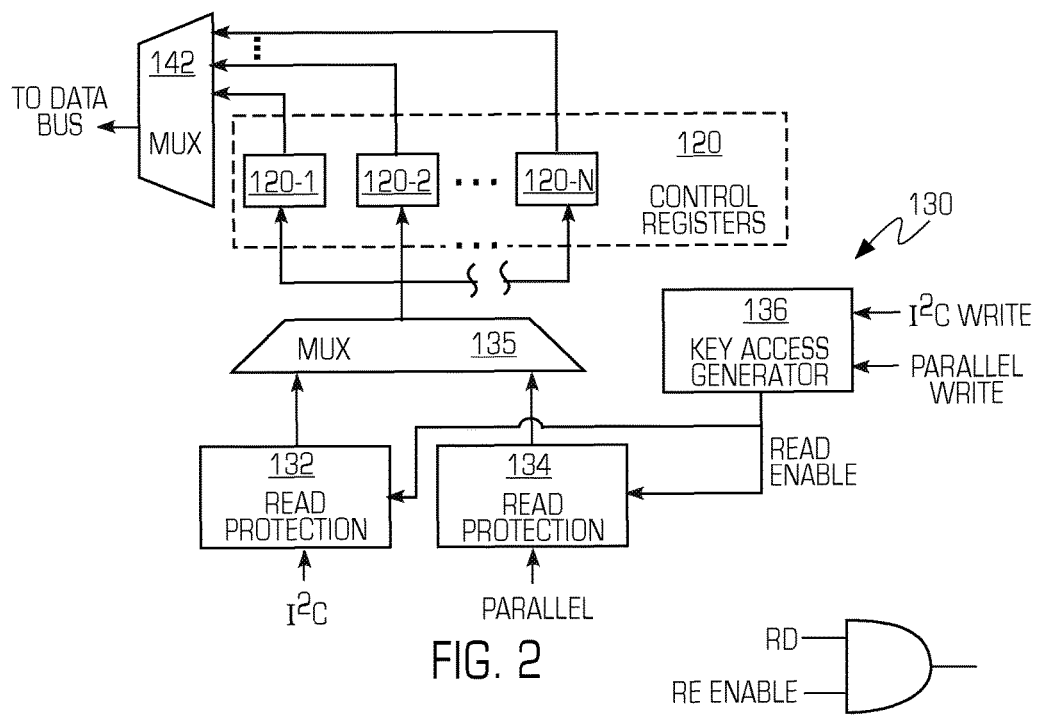
FIG. 2
FIG. 3

SYSTEM AND METHOD FOR PROTECTING DATA STORED IN THE CONTROL REGISTERS OF AN INTEGRATED CIRCUIT

FIELD OF THE INVENTION

The present invention relates to integrated circuits and more particularly, to a system and method for protecting data stored in the control registers of an integrated circuit, such as a television chip.

BACKGROUND OF THE INVENTION

Television systems typically include integrated circuits or "television chips" that perform various image and audio processing functions. A television chip may include several functional blocks or modules that each perform a corresponding function. Each functional block or module may be associated with one or more control registers that include data used by the module to manage and control the performance of the corresponding function. Based on the settings of these registers, television manufacturers can achieve different image and/or sound quality. Manufacturers of top-tier televisions may invest significant time and resources to determine the best settings for these registers to provide excellent picture quality and/or audio performance. As a result, manufacturers providing these top-tier televisions may have more expertise in tuning these registers and thus achieve a better overall picture quality based on their proprietary register settings. Other television manufacturers do not have similar expertise in fine tuning these registers for optimal picture quality. However, certain manufacturers have been known to obtain top-tier television systems and read the proprietary register settings from the television chips. These manufacturers can then use the settings to program similar television chips that may be used in their own television systems.

For at least these reasons, it would be desirable to provide a system and method for protecting the data stored in the control registers of television chips.

SUMMARY OF THE INVENTION

The present invention provides a system and method for protecting data stored in the control registers of an integrated circuit, such as a television chip.

In one non-limiting embodiment, the system and method use one or more selectively activated read protection modules to prevent control registers on an integrated circuit from being read unless a predetermined key or password is inputted. The password or key may be stored in password registers within the chip. A key access generator will enable read access of the control registers if correct values are written to the associated password registers. The key access generator may enable read access for a predetermined period of time or until it receives another input.

One non-limiting advantage of the present invention is that allows companies that use television chips to selectively protect proprietary control register settings.

Another non-limiting advantage of the present invention is that it provides separate and independent read protection for serial port access and parallel port access of control registers.

Another non-limiting advantage of the present invention is that it allows users to selectively enter and modify their own passwords for read access of control registers.

According to one non-limiting aspect of the present invention, a system for protecting data stored within control registers of an integrated circuit is provided. The system includes a read protection circuit that selectively prevents data from being read from the control registers unless a predetermined key is inputted into the read protection circuit.

According to another non-limiting aspect of the present invention, a television chip is provided. The television chip includes a plurality of functional modules that perform processing functions; a plurality of control registers that are associated with the functional modules and that store data used by the modules to control performance of processing functions; one or more ports for communicating with the television chip; one or more read protection modules that are operatively disposed between the control registers and the one or more ports, and that when activated, prevent data from being read from the control registers by use of the one or more ports; and a key access generator that receives input values, compares the input values to one or more predetermined keys, and, if the input values are equal to one or more predetermined keys, disables one or more read protection blocks to allow the data stored in the control registers to be read by use of the one or more ports.

According to another non-limiting aspect of the present invention, a method for protecting data stored on control registers in a television chip is provided. The method includes selectively preventing data from being read from the control registers by use of a port unless a predetermined key is inputted into the port. In one embodiment, selectively preventing data from being read from the control registers may include receiving input values from the port; comparing the input values to the predetermined key; and if the input values are equal to the at least one predetermined key, enabling read access to the data stored in the control registers through the port.

These and other features and advantages of the invention will become apparent by reference to the following specification and by reference to the following drawings.

BRIEF DESCRIPTION OF THE DRAWINGS

FIG. 1 is a block diagram of a television chip employing a system and method for protecting data stored in the control registers of the chip, according to one embodiment of the present invention.

FIG. 2 is a block diagram illustrating one embodiment of a system for protecting data stored in the control registers of a television chip, according to the present invention.

FIG. 3 illustrates one embodiment of a read protection module, according to the present invention.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

FIG. 1 illustrates a block diagram of a television chip 100 employing a system and method for protecting data stored in control registers, according to one embodiment of the present invention. While the embodiment disclosed relates to a television chip, it should be appreciated that the invention may be implemented in any type of integrated circuit having control registers with stored data.

Television chip 100 may be an integrated circuit including several functional blocks or modules 110 that perform various image and/or audio processing functions (e.g., chrominance processing, luminance processing, de-interlacing, motion adaptive processing, sharpness control, digital noise reduction image processing, scaling, and the like). Each module 110 is associated with one or more control registers 120 that include data used by the module to manage and control the performance of the module's corresponding function. Chip 100 includes a password protection block or circuit 130 that prevents unauthorized reading of data from control registers 120. A microcontroller or central processing unit (CPU) 140 may be operatively coupled to television chip 100 by way of a serial (e.g., I$^2$C) port 150 and a parallel port 160. In one embodiment, a conventional memory unit 170, such as a DRAM unit, may also be coupled to chip 100.

Chip 100 may be operatively disposed in a digital television system. Chip 100 receives video and audio input, processes that input and provides video output that may be communicated to a monitor or display, and audio output that may be communicated to a sound system. Video output may be in analog or digital format. Although only a single video input and video output is shown in FIG. 1, it should be appreciated that multiple video and audio inputs and outputs may be communicated to and from chip 100. Furthermore, television chip 100 may receive, demodulate and process inputs having combined video and audio data.

FIG. 2 illustrates one embodiment of a password protection system 130 for read protecting data in control registers 120, according to the present invention. While the following discussion relates to a system 130, it should be appreciated that each of the portions or blocks illustrated in FIG. 2 (as well as the other Figures) may represent logic steps or processes performed according to an inventive method. Conventional hardware, software and/or firmware may be used to perform the logic steps and/or processes. It should further be appreciated that such logic steps or processes can be implemented as computer-executable instructions stored on a computer readable medium.

Password protection system 130 may include read protection modules or blocks 132, 134 and a key access generator 136, which is communicatively coupled to blocks 132, 134 and to the serial port and parallel port. Read protection block 132 is coupled to the serial (I$^2$C) port and is operatively disposed between the CPU 140 and control registers 120. Read protection block 134 is coupled to the parallel port and is operatively disposed between the CPU 140 and the control registers 120. Read protection blocks 132, 134 are coupled to multiplexer 135, which may select between the signals generated from each block, and communicate the signals to control registers 120-1 through 120-N.

Read protection blocks 132, 134 may be formed from conventional circuit components and may be designed to communicate a read signal from CPU 140 to the control registers 120 only if key access generator 136 has provided a read enable signal. FIG. 3 illustrates one embodiment of a read protection block that may be used in the present invention. As shown, the read protection block may be formed from an AND gate. The inputs to the AND gate are the read signal from CPU 140 (by way of the serial or parallel port) and the read enable signal from key access generator 136. The output of the read protection block will not be activated (e.g., "1") unless both the read signal and read enable signal are activated (e.g., "1").

Registers 120-1 through 120-N are communicatively coupled to a multiplexer 142. Upon receipt of a read signal (e.g., an active "1" signal from multiplexer 135), control registers 120-1 through 120-N communicate their respectively stored data to multiplexer 142, which communicates the data to a data bus that provides a channel for transferring register values external to chip 100.

Key access generator 136 may be formed from conventional circuit components and may be designed to generate the read enable signal only if a correct protection key or password is written to the generator 136, e.g., by way of the serial or parallel port. In one embodiment, the protection key may be a set of selected on-chip register settings written through the serial port or parallel port, e.g., a predetermined set of values written to a predetermined set of registers. The password registers may be located within the key access generator module 136 or communicatively coupled to the module. The correct key values must be written to the correct registers before any read access to control registers 120 is allowed (e.g., before the read enable signal is generated). In one embodiment, a different protection key (e.g., different values to different registers) may be used for serial port access and for parallel port access. In one embodiment, the key access generator 136 generates the read enable signal for a predetermined period of time after receiving the correct key or password. In another embodiment, the key access generator 136 generates the read enable signal until it receives another input written from the serial or parallel port.

In operation, a user or developer can read the current values out of the control registers 120 by entering the correct key or password. In one embodiment, the user inputs the correct values to the assigned password registers by use of the CPU 140, either through the serial port or parallel port. Key access generator 136 receives these values and compares them to the correct values, which may be stored in key access generator 136. If key access generator 136 determines that the key is correct, it will enable read access by generating the read enable signal. The correct key may be provided to the user by the supplier or manufacturer of the television chip 100. In one embodiment, the serial port and parallel port use different and independent keys. Activating the serial port key will only allow read access through the serial port, and activating the parallel port key will only allow read access through the parallel port. Once read access has been enabled, the CPU 140 can communicate a read signal from the correct (i.e., enabled) port to control registers 120, through the corresponding read protection block 132 or 134 and multiplexer 135. The read signal causes the data in registers 120-1 through 120-N to be outputted to multiplexer 142, which places the data onto a data bus where it can be transmitted and read.

Once a user has read the data from control registers 120 and/or written new data into control registers 120, the read protection function may be activated to protect the data. In one embodiment, the read protection function may be activated by writing an input, such as an incorrect key, into the key access generator 136. Upon receiving the input, key access generator 136 will disable the read enable signal (e.g., set read enable to "0") until a correct key or password is entered again. In another embodiment, the read protection function may be activated by use of an internal timer. That is, the key access generator will automatically disable the read enable signal (e.g., set read enable to "0"), after a predetermined period of time has expired after the correct key was entered. In other embodiments, different ways may be used to activate and deactivate read access.

In one embodiment, a user can set a new key or password by inputting a predetermined sequence of values into the key access generator 136 after entering a correct key. When the key access generator 136 detects the predetermined sequence of values it enters into a wait state where it waits for new key values to be received (e.g., through the serial port or parallel port). Once the key access generator 136 receives the new values, it sets the respective password (serial or parallel) equal to the new values.

From the foregoing, it should be apparent that the present invention provides an improved system and method for read protecting data contained in the control registers of an integrated circuit such as a television chip.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A system, comprising:
  a central processing unit (CPU); and
  a digital television chip operable to prevent unauthorized access to at least one performance parameter, wherein the digital television chip comprises:
    a video processing component configured to receive combined video data, customize a display picture quality according to the combined video data, and communicate a plurality of video outputs, wherein at least one video output of the plurality of video outputs is in an analog format and at least one video output of the plurality of video outputs is in a digital format;
    at least one control register associated with the video processing component, and having a value associated with said at least one performance parameter that controls operation of the video processing component; and
    a read protection component configured to prevent the value associated with said at least one performance parameter from being read out of the at least one control register by the CPU, wherein the read protection component is configured to prevent data from being read out of the at least one control register to a port while simultaneously allowing data to be read out of the at least one control register to the video processing component, and wherein said read protection component comprises a serial port and a parallel port, and wherein access, to said at least one performance parameter, via said serial port is selectably enabled and independent of whether access, to said at least one performance parameter, via said parallel port is enabled.

2. The system of claim 1, wherein the read protection component comprises a key access generator that is configured to:
  receive input values;
  compare the input values to a predetermined key; and
  if the input values are equal to the predetermined key, disable the read protection component to allow the data stored in the at least one control register to be read;
  and wherein the read protection component comprises an AND gate, and wherein an input to the AND gate is an output from the key access generator and another input to the AND gate is a read signal.

3. The system of claim 1, wherein the read protection component is configured to lock access to the at least one control register.

4. The system of claim 1, wherein the read protection component is configured to unlock access to the at least one control register, to allow controlling of the video processing component through changes to the at least one performance parameter.

5. The system of claim 2, wherein the predetermined key comprises a predetermined set of values written to a predetermined set of registers of the control registers.

6. A system, comprising:
  a central processing unit (CPU); and
  a digital television chip operable to prevent unauthorized access to at least one performance parameter, wherein the digital television chip comprises:
    an audio processing component configured to receive combined audio data, customize an audio quality according to the combined audio data, and communicate a plurality of audio outputs;
    at least one control register associated with the audio processing component, and having a value associated with at least one performance parameter that controls the operation of the audio processing component; and
    a read protection component configured to prevent the value associated with said at least one performance parameter from being read out of the at least one control register by the CPU, wherein the read protection component is configured to prevent data from being read out of the at least one control register to a port while simultaneously allowing data to be read out of the at least one control register to the audio processing component, and wherein said read protection component comprises a serial port and a parallel port, and wherein access, to said at least one performance parameter, via said serial port is selectably enabled and independent of whether access, to said at least one performance parameter, via said parallel port is enabled.

7. The system of claim 6, wherein the read protection component comprises a key access generator that is configured to:
  receive input values,
  compare the input values to a predetermined key; and
  if the input values are equal to the predetermined key, disable the read protection component to allow the data stored in the at least one control register to be read.

8. The system of claim 7, wherein the read protection component is configured to lock access to the at least one control register.

9. The system of claim 8, wherein the read protection component is configured to unlock access to the at least one control register, to allow controlling of the audio processing component through changes to the at least one parameter stored in the at least one control register.

10. The system of claim 7, wherein the predetermined key comprises a predetermined set of values written to a predetermined set of registers of the control registers.

\* \* \* \* \*